Feb. 7, 1939. G. E. PALMER 2,146,648
ELECTRIC SERVICE SWITCH
Filed Dec. 17, 1936 2 Sheets-Sheet 1
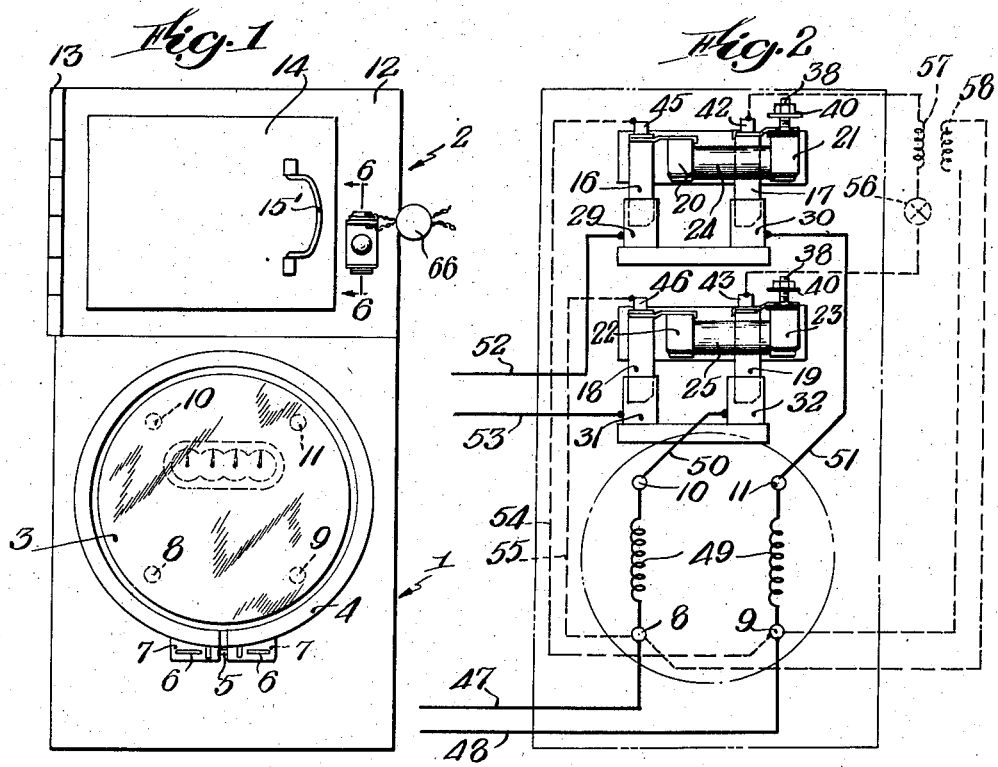
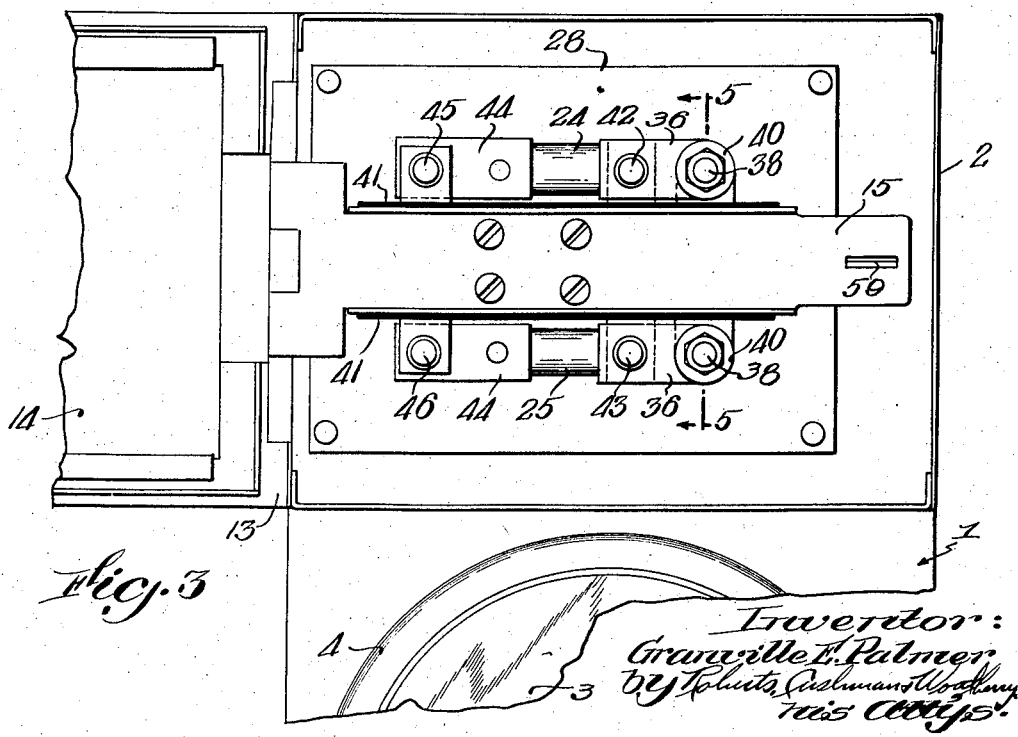
Inventor:
Granville E. Palmer Feb. 7, 1939.　　　G. E. PALMER　　　2,146,648
ELECTRIC SERVICE SWITCH
Filed Dec. 17, 1936　　　2 Sheets-Sheet 2
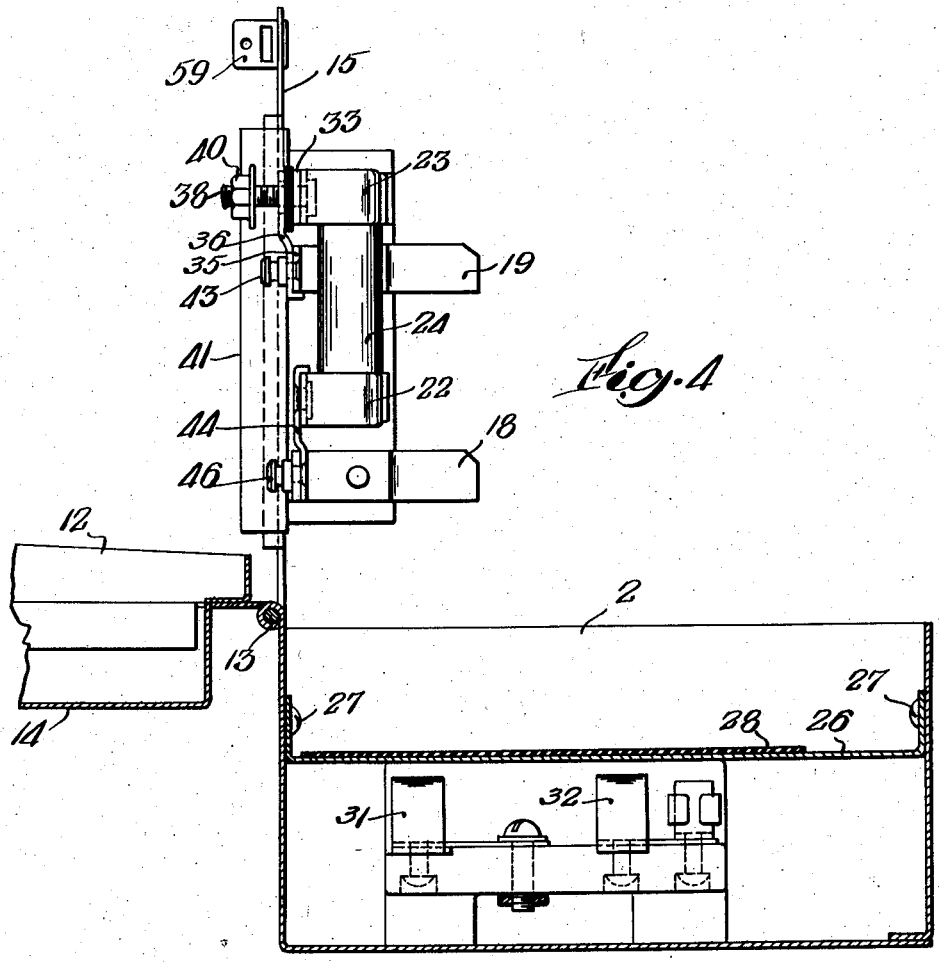
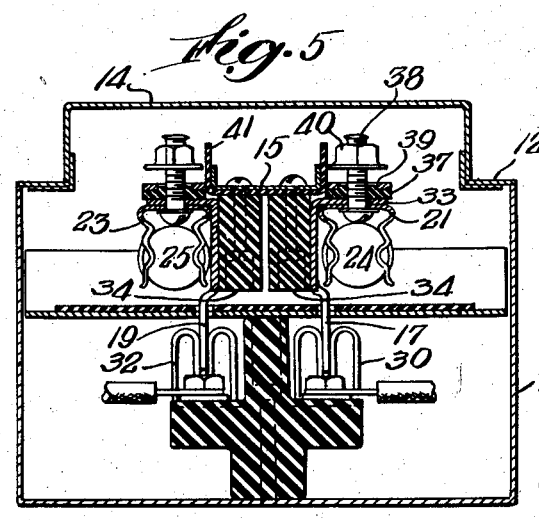
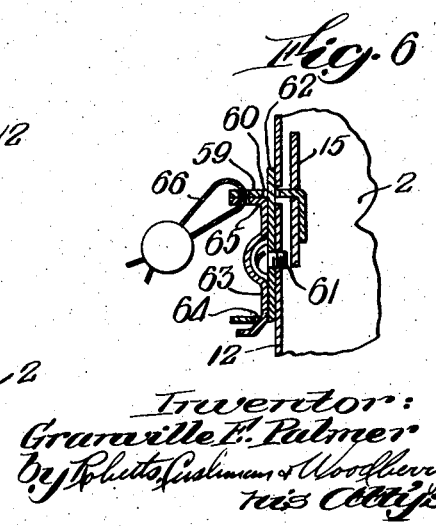

Patented Feb. 7, 1939

2,146,648

UNITED STATES PATENT OFFICE 2,146,648

ELECTRIC SERVICE SWITCH

Granville E. Palmer, Cambridge, Mass., assignor, by mesne assignments, to Reconstruction Finance Corporation, Boston, Mass., a United States corporation Application December 17, 1936, Serial No. 116,299

12 Claims. (Cl. 175—183)

The object of this invention is to improve and simplify the equipment used in the control and measurement of electric current at what is generally known as the service entrance of electrical conductors into a building.

This simplification is secured by means of a case or housing enclosing the normal control devices, such as the switch, the terminals for the electric current measuring device, such as a meter, an additional circuit opening device used in the testing of said meter and manually operable cover means of a cabinet to effect, when operated, the opening or closing of the circuit control device, or optionally, to effect only the exposure of the said additional circuit opening device so that this last said device may be used in the testing of a meter that is normally in he circuit with said normal control device and the said additional circuit control device.

The invention herein described provides for such a correlation of its component parts that these parts may be included in a small compass, but at the same time be readily accessible when accessibility is required. My improved device also affords inaccessibility when inaccessibility is required; and, through the double function of certain parts, serves the purpose of two or more devices in comparable equipment.

In many cases it is desirable that the switch or other controlling device of an electric service be mounted in close proximity to the electric meter and that the current carrying parts of these devices and the conductors connecting thereto be enclosed in a metallic cabinet of such dimensions that the requirements of the fire code are complied with. A further object of this invention is to provide a cabinet suitable to receive the above mentioned devices in which all the parts enclosed in the cabinet may be exposed for inspection to facilitate original installation or repairs or inspection at a later date, and at the same time to provide a cabinet of minimum size to house such equipment in a practical manner so that certain of these parts are inaccessibly enclosed by a lock or seal. Another object is to provide both normal circuit controlling means, such as a fuse and/or switch blade, and additional circuit controlling means, the latter being arranged for sealable enclosure in either circuit open or circuit closed position.

For the purpose of illustration a typical embodiment of the invention is shown in the accompanying drawings in which Fig. 1 is a front view;

Fig. 2 is a circuit diagram;

Fig. 3 is an enlarged front view with the cover open;

Fig. 4 is a transverse section with the cover opened through 180° and the switch opened through 90°;

Fig. 5 is a section on line 5—5 of Fig. 3 with the cover closed; and

Fig. 6 is a section on line 6—6 of Fig. 1.

The particular embodiment of the invention chosen for the purpose of illustration comprises a meter box 1 and a switch box 2 having the same cross-sectional dimensions and fastened together by internal screws (not shown). The meter box 1 has a circular flanged opening in its front, the meter 3 being mounted over this opening by a split channel-shaped ring 4 which fits over the abutting flanges of the box and meter. The split ends of the ring 4 are secured together by a bolt 5 which may be sealed in place by an ordinary sealing wire extending through the bolt head and one of the slots 6 in the ears 7 of the sealing ring 4. Upon removal of the sealing ring the glass cover of the meter may be removed to expose the test posts 8, 9, 10 and 11 without removing the meter from the box.

The switch box 2 and its contents are similar to those disclosed in the copending application of Ernest G. Johansson Serial No. 79,724, filed May 14, 1936, Patent No. 2,128,648, Aug. 30, 1938. As disclosed in that application the box 2 has a cover 12 hinged to the box 13 and provided with a raised central portion 14 having a handle 15' for opening the cover. Hinged to the same edge of the box 2 is a carrier 15 on the under side of which are mounted two pairs of switch contacts 16—17 and 18—19. Associated with these pairs of contacts are pairs of fuse clips 20—21 and 22—23 for cartridge fuses 24 and 25. Mounted intermediate the front and back of the box 2 is a partition 26 held in place by screws 27 and carrying a sheet of insulation 28, the partition and insulation having four slots to accommodate the switch contacts 16, 17, 18 and 19. Mounted behind the partition is the stationary portion of the switch comprising the stationary contacts 29—30 and 31—32 to engage with the contacts 16—17 and 18—19 when the switch is closed.

According to this invention each of the right-hand fuse clips 21 and 23 are mounted on the carrier through the medium of an angle piece 33 which is fastened to one of the insulation blocks 34 through the medium of screws (not shown). Each of the right-hand switch contacts 17 and 19 has an out-turned portion 35 at its upper end (Fig. 4, these out-turned ends carrying straps 36 which extend to the right into spaced juxtaposition with the out-turned portions of the angle pieces 33. Intermediate the overlapping portions of the parts 33 and 36 are pieces of insulation 37. The parts 21, 33 and 37 are interconnected by a bolt 38 threaded therethrough (Fig. 5). The straps 36 contain openings 39 somewhat larger than the bolts 38 and coaxial therewith. Threaded on the bolts 38 are nuts 40 which, when threaded inwardly against the straps 36, complete the circuit between the straps and the fuse clips. The carrier 15 comprises a channel-shaped piece of insulation the up-turned edges 41 of which project above the carrier 15 to insulate the carrier from the nuts 40. The straps 36 are provided with upwardly projecting test terminals 42 and 43, the inner ends of which serve as rivets to secure the straps to the out-turned upper ends of the switch contact members 17 and 19. The left-hand switch contacts 16 and 18 are likewise provided with straps 44 for interconnecting these contacts with the associated fuse clips, these straps being connected with the switch contacts 16 and 18 by means of rivets 45 and 46 which project upwardly in the form of test terminals.

As shown in Fig. 2 the electrical circuit enters the meter box at the lower left-hand corner through service wires 47 and 48, thence extends to the terminals 8 and 9, through the meter coils 49 to the terminals 10 and 11, through wires 50 and 51 extending through aligned openings in the two boxes to the stationary switch contacts 30 and 32, thence through the movable switch contacts 17 and 19, straps 36, nuts 40, bolts 38, fuse clips 21 and 23, fuses 24 and 25, straps 44, movable switch contacts 16 and 18, stationary switch contacts 29 and 31 and thence out of the switch box through load wires 52 and 53.

To test the meter the cover 12 is opened without opening the switch and the glass cover is removed from the meter. Temporary jumpers 54 and 55 are then connected to the test terminals 8—45 and 9—46 respectively to by-pass the meter. The nuts 40 are then backed up to disconnect the meter from the load circuit 52—53 and the test apparatus comprising an artificial load 56, a series coil 57 and a potential coil 58 is then connected to the test terminals 8, 9, 42 and 43 as indicated by broken lines at the right-hand side of Fig. 2. Thus the meter may be tested without interrupting the supply of current to the load circuit, without opening the switches and without removing the fuses.

As shown in Figs. 1 and 6, the switch cover 12 and the switch carrier 15 may be interconnected so that the switch is opened when the cover is opened. For this purpose the carrier 15 is provided with an upstanding lug 59 projecting upwardly through an opening in the cover and containing an opening 60. Mounted on the outside of the cover by means of a screw 61 is a latch 62 extending through the opening 60. The latch 62 is covered by a strap 63 extending through an opening 64 in the upturned end of the tongue and having an upturned end 65 adjacent the outer end of the lug 59. The parts 59 and 65 have registering openings through which a seal 66 may be applied. A customer's service may be discontinued by backing up the nuts 40 and then sealing the cover 12 and carrier 15 together so that the customer can not apply a wrench to the nuts 40. In the case of fire in a building containing a bank of these switches the firemen may open all of the circuits by opening the covers 12 without pausing to ascertain which services are in use and which have been discontinued.

It should be understood that the present disclosure is for the purpose of illustration only and that this invention includes all modifications and equivalents which fall within the scope of the appended claims. For example, it should be understood that instead of joining the meter box to the lower side of the switch box the former may be joined to the upper side or the right or left side of the latter, and that any one of the four sides of the meter box may be joined to any one of the four sides of the switch box, the relative positions of the parts depending upon various factors peculiar to different installations, particularly upon the locations of the service and load circuit conduits.

I claim:

1. An electric service device comprising a box, a cover for the box, a carrier movably mounted in the box, stationary switch contacts in the box and cooperating movable contacts actuated by the carrier, sealing means for interconnecting said cover and carrier so that the said movable and stationary switch contacts are separated when the cover is opened, and circuit controlling means for opening the circuit through said switch contacts without moving the carrier, said circuit controlling means being enclosed when the cover and carrier are sealed together.

2. An electric service device comprising a box, a cover for the box, a carrier movably mounted in the box, said cover and carrier being hinged to the box to swing about substantially the same axis so that they may be swung together or independently, stationary switch contacts in the box and cooperating movable contacts actuated by the carrier, sealing means for interconnecting said cover and carrier so that the said movable and stationary switch contacts are separated when the cover is opened, and circuit controlling means for opening the circuit through said switch contacts without moving the carrier, said circuit controlling means being enclosed when the cover and carrier are sealed together.

3. An electric service device comprising a box, a cover for the box, a carrier movably mounted in the box with an outer side facing the cover when the cover is closed, stationary switch contacts in the box and cooperating movable contacts actuated by the carrier, circuit controlling means on the said outer side of the carrier for opening the circuit through said switch contacts without moving the carrier, and detachable means for interconnecting said cover and carrier so that the said movable and stationary switch contacts are separated when the cover is opened.

4. An electric service device comprising a box, a cover for the box, a carrier movably mounted in the box with an outer side facing the cover when the cover is closed, said cover and carrier being hinged to the box to swing about substantially the same axis so that they may be swung together or independently, stationary switch contacts in the box and cooperating movable contacts actuated by the carrier, circuit controlling means on the said outer side of the carrier for opening the circuit through said switch contacts without moving the carrier, and detachable means for interconnecting said cover and carrier so that the said movable and stationary switch contacts are separated when the cover is opened.

5. An electric service device comprising a box, a cover for the box, a carrier movably mounted in the box, stationary switch contacts in the box and cooperating movable contacts actuated by the carrier, sealing means for interconnecting said cover and carrier so that the said movable and stationary switch contacts are separated when the cover is opened, a fuse mounted on said carrier and interconnected between said movable contacts, and circuit controlling means between said fuse and one of said movable contacts for opening the circuit through said switch contacts and fuse without moving the carrier, said circuit controlling means being enclosed when the cover and carrier are sealed together.

6. An electric service device comprising a box, a cover for the box, a carrier movably mounted in the box, said cover and carrier being hinged to the box to swing about substantially the same axis so that they may be swung together or independently, stationary switch contacts in the box and cooperating movable contacts actuated by the carrier, sealing means for interconnecting said cover and carrier so that the said movable and stationary switch contacts are separated when the cover is opened, a fuse mounted on said carrier and interconnected between said movable contacts, and circuit controlling means between said fuse and one of said movable contacts for opening the circuit through said switch contacts and fuse without moving the carrier, said circuit controlling means being enclosed when the cover and carrier are sealed together.

7. An electric service device comprising a box, a cover for the box, a carrier movably mounted in the box with an outer side facing the cover when the cover is closed, stationary switch contacts in the box and cooperating movable contacts on the inner side of the carrier, means on the inner side of the carrier for interconnecting a fuse between said movable contacts, circuit controlling means on the said outer side of the carrier for opening the circuit through said switch contacts and fuse without moving the carrier, and detachable means for interconnecting said cover and carrier so that the said movable and stationary switch contacts are separated when the cover is opened.

8. An electric service device comprising a box, a cover for the box, a carrier movably mounted in the box with an outer side facing the cover when the cover is closed, said cover and carrier being hinged to the box to swing about substantially the same axis so that they may be swung together or independently, stationary switch contacts in the box and cooperating movable contacts on the inner side of the carrier, means on the inner side of the carrier for interconnecting a fuse between said movable contacts, circuit controlling means on the said outer side of the carrier for opening the circuit through said switch contacts and fuse without moving the carrier, and detachable means for interconnecting said cover and carrier so that the said movable and stationary switch contacts are separated when the cover is opened.

9. An electric service device comprising a meter, a switch, a fuse, and means for electrically interconnecting said parts together, a cover for the meter and a cover for the switch and fuse, test terminals under said covers respectively for by-passing and testing the meter when the covers are opened, a carrier movable between circuit-closing and circuit-opening position, said fuse and the movable contacts of said switch being mounted on said carrier, means on the carrier for disconnecting the meter from said fuse without moving the carrier from circuit-closing position and without removing said fuse, and means interlocking said carrier and switch cover together to render said test means inaccessible, said switch being freely movable between open and closed positions while said carrier and switch cover are interlocked together.

10. An electric service device comprising a meter, a switch, a fuse, and means for electrically interconnecting said parts together, a cover for the meter and a cover for the switch and fuse, test terminals under said covers respectively for by-passing and testing the meter when the covers are opened, a carrier movable between circuit-closing and circuit-opening position, said fuse and the movable contacts of said switch being mounted on the inner side of said carrier, means on the outer side of the carrier for disconnecting the meter from said fuse without moving the carrier from circuit-closing position and without removing said fuse, and means interlocking said carrier and switch cover together to render said test means inaccessible, said switch being freely movable between open and closed positions while said carrier and switch cover are interlocked together.

11. An electric service device comprising a box, a carrier hinged to one side of the box to swing back and forth between open and closed positions, a stationary switch member within the box, a switch element on the inner side of said carrier for engagement with said stationary member when the carrier is in closed position, a contact element on the inner side of carrier in spaced relation to said switch element, and means on the outer side of said carrier for interconnecting or disconnecting said elements while the carrier is in said position.

12. An electric service switch comprising a box, a cover for the box, a carrier movably mounted in the box, normal circuit controlling means including stationary switch contacts in the box and cooperating movable contacts actuated by the carrier, sealable means for interconnecting the cover and carrier so that the said movable and stationary contacts are separated when the cover is opened, and additional circuit controlling means for opening the circuit through said switch contacts without moving the carrier, said additional circuit controlling means being enclosed between the cover and the carrier.

GRANVILLE E. PALMER.